Oct. 28, 1958   O. C. WINZEN ET AL   2,858,090
BALLOON HAVING REINFORCED SEAL
Filed Feb. 21, 1955   2 Sheets-Sheet 2
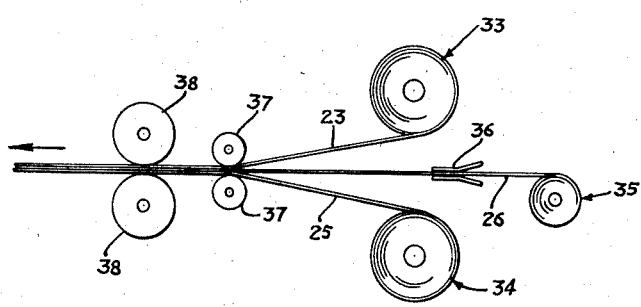
FIG. 14
FIG. 6
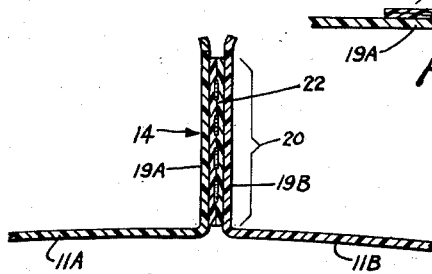
FIG. 4
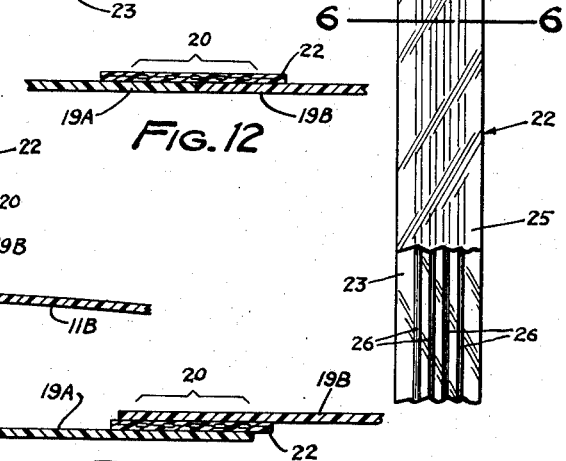
FIG. 5 / FIG. 12 / FIG. 13 / FIG. 10
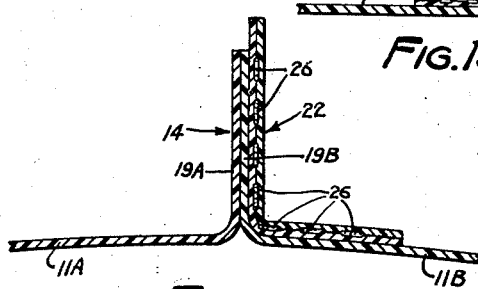
FIG. 8
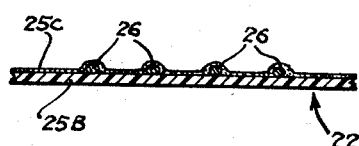
FIG. 9
INVENTORS
OTTO C. WINZEN
BY VERA H. WINZEN
Paul, Moores Rugger
ATTORNEYS

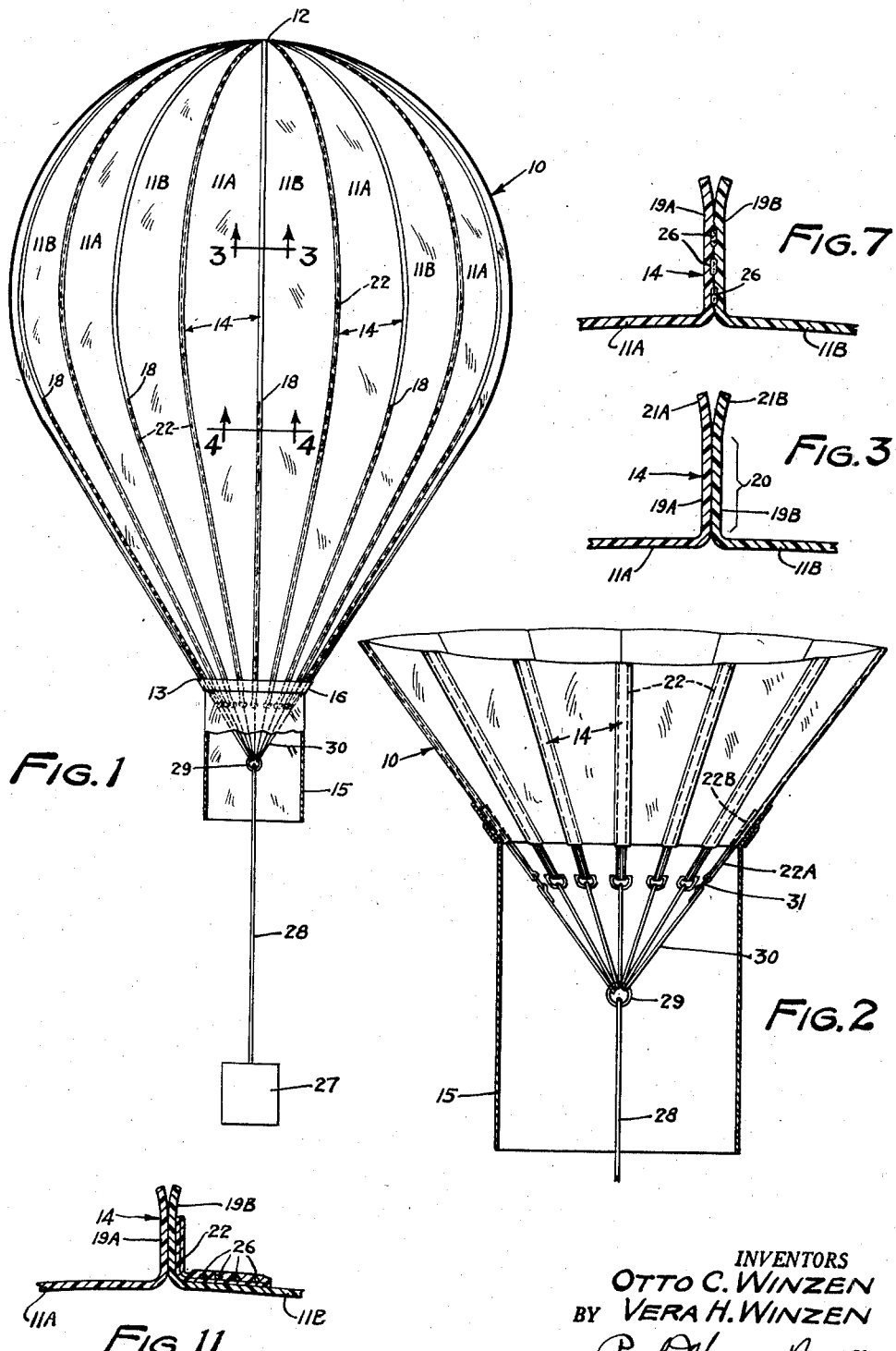

United States Patent Office 2,858,090
Patented Oct. 28, 1958

2,858,090

BALLOON HAVING REINFORCED SEAL

Otto C. Winzen and Vera H. Winzen, Mendota Township, Dakota County, Minn., assignors to Winzen Research, Inc., Minneapolis, Minn., a corporation of Minnesota Application February 21, 1955, Serial No. 489,374

5 Claims. (Cl. 244—31)

This invention pertains to seals for balloons generally, and particularly to improvements in reinforced seals for joining adjacent gores or sections of a balloon to provide a gas-proof envelope. This invention is extremely useful in providing novel structure for supporting loads from balloon envelopes, where two flexible members are to be joined or sealed together, and it is desired to provide a stable or reinforced juncture.

With the advent of balloons comprised of a plurality of gores or sections of a thin film of plastic or synthetic resinous material, there has arisen the problem of providing a secure gas-proof bond or seal between adjacent gores, and of providing means for reinforcing such seals so that a load may be supported therefrom. One attempt to solve such problem is shown in Patent No. 2,526,719.

It is therefore an object of this invention to provide new and useful reinforced seals for adjacent gores of a balloon or the like.

Still another object of the invention resides in the provision of a reinforced balloon seal or the like embodying a plurality of filamentous reinforcing members whereby a load may be suspended from said seal.

Another object of this invention resides in new and useful means for suspending a load from a balloon envelope.

Further objects of the invention are to provide new and useful balloon seal constructions or the like providing a tensile load supporting member; new and useful reinforced load bearing tapes for balloon; and to new and useful reinforced load bearing seals for adjacent gores of a balloon envelope.

The invention will be described specifically with reference to seals for adjacent gores of balloon envelopes within the spirit and scope of this invention.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

Figure 1 is an elevational view, partially in section, and illustrating a balloon embodying this invention;

Figure 2 is an enlarged fragmentary, elevational view, partly in vertical section and showing the balloon appendix and load harness of Figure 1;

Figure 3 is a fragmentary, horizontal, sectional view, taken along the line and in the direction of the arrows 3—3 of Figure 1, and showing a seal between two adjacent gores of a balloon envelope;

Figure 4 is a fragmentary, horizontal, sectional view, taken along the line and in the direction of the arrows 4—4 of Figure 1, and showing a reinforced seal between two adjacent gores of a balloon envelope;

Figure 5 is an elevational view partly broken away and showing a reinforcing member or reinforced load tape;

Figure 6 is a horizontal sectional view taken along the line 6—6 of Figure 5;

Figure 7 is a view similar to Figure 4, but showing a modified form of the invention;

Figure 8 is a view similar to Figure 7 and showing a second modified form of the invention;

Figure 9 is a view similar to Figure 6 but showing a modified form of the reinforcing member of this invention;

Figure 10 is a view similar to Figure 9 but showing another modified form of the reinforcing member of this invention;

Figure 11 is a view similar to Figure 4 but showing still another modified form of this invention;

Figure 12 is a sectional view through another form of seal of the instant invention;

Figure 13 is a view similar to Figure 12 but showing a further modified form of seal of the instant invention; and Figure 14 is a diagrammatic view of apparatus for making the reinforced structure of Figures 4, 5, 6, 7, 8 and 10.

Turning now to the drawings, particularly to Figure 1, there is shown a balloon generally designated 10, which comprises a plurality of gores, alternate members of which are designated 11A, and intermediate members of which are designated 11B. These gores each extend vertically from the apex end 12 to the appendix end 13 of the balloon. The gores 11A—11B are conventionally of uniform shape, extend vertically of the balloon as shown in Figure 1, having a width dimension greater at approximately the center of the balloon than at either the apex or the appendix end. The gores, comprising the balloon envelope, may be made of a variety of materials, but should comprise a sealable, preferably heat-sealable, thin, smooth, tough, pliable, membraneous, relatively inextensible film which is relatively impermeable to the passage of gaseous material. A superior material having these characteristics is polyethylene. However, other materials available for use in forming a relatively thin, impermeable thermoplastic synthetic resinous film of the gores, which comprises the envelope of the balloon, are such materials as "Cry-O-Rap," butadiene-acrylonitrile copolymer, manufactured by the Dewey & Almy Chemical Company; moisture resistant cellophanes, that is, regenerated cellulose sheets coated with lacquers or the like to improve their moisture resistance; vinyl chloride-vinylidene chloride copolymers; plasticized rubber hydrochloride which is readily sealed by heat and is available in the form of transparent sheets and under the trademark "Pliofilm" from the Goodyear Tire & Rubber Company; thermoplastic resins produced by the polymerization of vinylidene chloride alone or with other monomers under the trademark "Saran" by Dow Chemical Co.; plasticized vinyl chloride-vinyl acetate copolymers available from many manufacturers; butadiene-styrene copolymers; and many other resinous materials may be used either as films or in laminates. Polyethylene film has been found superior.

The adjacent edges of the gores are bonded together, and as preferred, when thermoplastic, by heat-sealing, to produce a finned taped juncture, generally designated 14, as illustrated in Figure 3.

As illustrated in Figures 1 and 2, the balloon in this instance is provided with an appendix skirt 15 joined to the balloon envelope by any suitable means, as shown, by a pressure sensitive tape 16. However, the skirt of itself forms no part of this invention and may be omitted if desired. Thus, this invention may be used with open appendix balloons, pressurized balloons, apex inflated balloons, etc.

As shown in Figure 1, each one of the junctures 14 comprises a reinforced member throughout at least a portion thereof. For illustration, the reinforcement has been shown only as extending to point 18, which is substantially midway of the distance between the appendix end 13 and the apex end 12 of the balloon, for alternate junctures 14 and entirely up to the appendix end 12 for intermediate junctures 14. However, this is a matter of choice and all of the junctures could be reinforced up to the appendix end 12, all could be reinforced only to point 18 or any desired combination thereof could be chosen.

As shown in Figure 3, the non-reinforced portion of the finned juncture 14 consists of a turned end 19A of gore 11A, a turned end 19B of similar extension and placed in abutment with turned end 19A. The ends 19A and 19B are heat-sealed throughout the contacting surfaces area under the bracket 20 and are unsealed throughout their extreme terminal edges 21A and 21B respectively.

The portion of the finned juncture 14 which is reinforced, includes in addition, a reinforcing member 22 as shown best in Figure 4. The construction of the reinforcing member is shown in larger scale in Figures 5 and 6 and will be described with reference to those figures. The reinforcing member 22 comprises two layers or laminations of flexible tape, likewise of synthetic resinous material and preferably of the identical thermoplastic synthetic resinous material forming the gores 11A—11B. Between the tapes 23 and 25 is positioned a plurality of reinforcing members or filaments 26 extending longitudinally of the tape and in parallel relationship.

In this instance, the reinforcing members are glass-fiber filaments, rovings or cords, but other flexible reinforcing members having a high tensile strength, such as synthetic resinous filaments, metallic filaments, etc., may be used without departing from the spirit and scope of this invention. It is preferable to use filaments having a surface to which the tape may be firmly bonded.

In Figure 6, the tapes 23 and 25 are heat-sealed together, along a median line, to the reinforcing glass fiber filaments 26 and compressing the normally round flexible filaments 26 slightly into the oval configuration shown in that figure. The plies 23 and 25 are joined throughout their extension not only at the edges thereof but in the spaces between the reinforcing filaments 26.

The composite reinforcing tape member 22 is sealed between the ends 19A and 19B as shown in Figure 4 to provide the reinforced juncture.

In the modification shown in Figure 7, the reinforcing filaments 26 are not provided with the tapes 23 and 25 but are bonded directly between the inturned ends 19A and 19B.

This modification may be useful in some instances, particularly where lightness in weight, coupled with strength is desired. In this modification, of course, it is extremely desirable that the reinforcing members 26 be of such material as will intimately bond to the ends 19A and 19B.

In the modification shown in Figure 8, the reinforcing tape 22 instead of being bonded between the ends 19A and 19B is bonded to the exterior of end 19B as shown, the seals being made throughout the portion of the reinforcing member 22 including the reinforcing filaments 26. In the modification shown in Figure 11, the reinforcing member 22 is likewise bonded to the exterior of end 19B but is bonded throughout a portion not including the reinforcing filaments 26.

In the modification shown in Figure 10, the reinforcing member 22' of Figure 5, instead of being formed from thermoplastic members 23 and 25 heat-sealed together, is formed of two members 25A and 25B secured together by an adhesive 25C.

In the modification shown in Figure 9, the lamination 25A has been omitted and the adhesive 25C secures the reinforcing members 26 to lamination 25B.

It has been found of particular importance to utilize thermoplastic films for the gores 11A and 11B, reinforcing elements 26 which may readily bond to such thermoplastic films and to use thermoplastic films having substantially identical co-efficient of expansion for the tapes 23 and 25. It is preferred to use one homogenous thermoplastic film for gores and tapes, however.

In the modifications shown in Figures 12 and 13, the ends 19A and 19B of gores 11A and 11B are not turned to provide the finned structure shown in Figures 1–4, 7 and 8, but are joined in flatwise relation. Thus, in the modification of Figure 12, ends 19A and 19B are placed in abutment, member 22 (with its included reinforcing members 26) is superimposed on ends 19A and 19B as shown and heat-sealed thereto throughout the bracket 20.

In Figure 13, end 19B is overlapped on end 19A with member 22 (with its included reinforcing members 26) sandwiched therebetween and the composite sealed under the bracket 20.

In the construction shown in Figures 1 and 2, a load 27 is suspended from portions of the reinforcing members 22, extending beyond the appendix end 13 of the balloon. Thus, load 27 is suspended from a supporting cable 28 secured at the other end to a harness ring 29, in turn supported by a plurality of cables 30 from a plurality of D-rings 31. To each of the D-rings is secured an extension 22A of reinforcing member 22, the terminal end of which 22B is doubled back upon itself and bonded thereto.

Thus, there is provided a reinforcement for the finned seals or junctures 14 having extensions 22A doubled back and cemented to themselves around D-rings 31 to effectively support a load from the finned junctures 14.

In Figures 8 and 11, the finned junctures have been illustrated as standing at approximately right angles to the gores 11A and 11B. However, in practice, when the reinforcement 22 is secured to the exterior of the fins, the fins will be turned in a direction opposite the side on which the reinforcing member 22 is secured and lay substantially flat against gore 11A. The fins 14 are shown at the angle of Figures 8 and 11 for the purposes of clarity.

If the modification of Figure 7 is being used, then the extensions corresponding to extensions 22A will comprise only the filaments 26, which may be passed around D-rings 31 and tied, cemented or otherwise secured thereto.

This construction may likewise be used with the modifications of Figures 12 and 13 in which instance the seals would be flat as shown in those figures.

In Figure 14 is shown in diagrammatic form, the apparatus by which the flexible tape or reinforcing member 22 may be constructed. Thus, two supply rolls 33 and 34 are journalled in spaced relation, one for each of the elongated plies 23 and 25 respectively. The plies are coiled thereon and are drawn from adjacent portions of the periphery of the rolls as shown in Figure 14 by any suitable means. A third roll is provided on which is threaded a plurality of reinforcing members 26 at spaced intervals. Guide 36 is positioned between rolls 33 and 34 and spaced from roll 35. It has a funnel shape as shown and serves to guide the filaments 26 as they are unwound from roll 35, in between the two plies 23 and 25 as they are squeezed together by squeeze roll 37. Squeeze rolls 37 are journalled in slightly spaced relation to each other but considerably spaced from rolls 33 and 34 and serve to draw plies 23 and 25 into abutment with the reinforcing filaments 26 therebetween. Rotary sealing elements 38, electrically heated, serve continuously to fuse and bond the laminations 23 and 25 together with the reinforcing filaments 26 therebetween.

If desired, the squeeze rolls 37 may be driven for frictionally moving plies 23 and 25 and filaments 26 in the direction of the arrow of Figure 14 or the rotary sealing elements 38 may likewise be driven. Further independent drawing means for the movement of the laminations 23 and 25 and the filaments 26 may be provided if desired.

As many widely differing embodiments of this invention may be made without departing from the spirit and scope thereof, it is to be understood that the specific embodiments described are given by way of example only and the invention is limited only by the terms of the appended claims.

What is claimed is:

1. A balloon for carrying a load comprising a gas containing envelope formed by a plurality of elongated gores extending generally lengthwise thereof, each gore joined along an edge to an adjacent gore to form a seam, said seam comprising an adjacent edge of each elongated gore turned outwardly of the balloon envelope and positioned substantially parallel and in contact with each other to form a fin, a reinforcing and load carrying member of flexible thermoplastic material having a portion thereof heat-sealed to one side only of said fin, said edges being heat-sealed together and to said reinforcing member throughout a common area.

2. The structure of claim 1 further characterized by said reinforcing member including a plurality of filamentous reinforcing elements.

3. The structure of claim 1 further characterized by load carrying means attached to an extending end of said reinforcing member.

4. The structure of claim 1 further characterized by reinforcing members secured to less than all of the seams of the balloon.

5. The structure of claim 1 further characterized by said reinforcing member comprising a tape having a plurality of aligned filamentous reinforcing elements therein and said tape being heat-sealed to said fin throughout a narrow weld.

References Cited in the file of this patent

UNITED STATES PATENTS

| | | |
|---|---|---|
| 1,601,029 | Ligonnet | Sept. 28, 1926 |
| 2,384,462 | Goodman | Sept. 11, 1945 |
| 2,387,566 | Custers | Oct. 23, 1945 |
| 2,422,725 | Gilfillan | June 24, 1947 |
| 2,444,059 | Neher | June 29, 1948 |
| 2,444,150 | Best | June 29, 1948 |
| 2,495,680 | Andrews | Jan. 31, 1950 |
| 2,526,719 | Winzen | Oct. 24, 1950 |
| 2,584,633 | Southwick | Feb. 5, 1952 |
| 2,598,696 | Huch | June 3, 1952 |
| 2,679,469 | Bedford | May 25, 1954 |
| 2,719,100 | Banigan | Sept. 27, 1955 |
| 2,749,966 | Roetger | June 12, 1956 |
| 2,758,342 | Squires | Aug. 14, 1956 |
| 2,767,940 | Melton | Oct. 23, 1956 |
| 2,767,941 | Gegner et al. | Oct. 23, 1956 |